United States Patent [19]
Warren

[11] Patent Number: 6,132,477
[45] Date of Patent: Oct. 17, 2000

[54] METHOD OF MAKING LAMINATED POLYMERIC RECHARGEABLE BATTERY CELLS

[75] Inventor: Paul C. Warren, Far Hills, N.J.

[73] Assignee: Telcordia Technologies, Inc., Morristown, N.J.

[21] Appl. No.: 09/316,120

[22] Filed: May 20, 1999

[51] Int. Cl.[7] .................................................. H01M 6/00

[52] U.S. Cl. .................... 29/623.1; 29/623.3; 429/127; 429/217; 156/182; 156/249

[58] Field of Search ............................... 29/623.1, 623.4, 29/623.3; 429/217, 127, 185; 156/182, 249

[56] References Cited

U.S. PATENT DOCUMENTS 5,547,780  8/1996  Kagawa et al. ..................... 429/149

*Primary Examiner*—Maria Nuzzolillo
*Assistant Examiner*—Raymond Alejandro
*Attorney, Agent, or Firm*—David A. Hey

[57] ABSTRACT

The dangers of short-circuiting and lithium metal plating during recharging of a unitary laminate lithium-ion intercalation battery cell are alleviated by trimming the periphery of the cell with a transverse slicing cut made at an angle from the perpendicular of the major plane surface of the cell. The resulting angled peripheral edges of the cell provides greater edge separation between electrode layers and reduces the occurrence of metal-plating accumulation of lithium ions at the edge surface of the negative electrode.

10 Claims, 2 Drawing Sheets

Prior Art

METHOD OF MAKING LAMINATED POLYMERIC RECHARGEABLE BATTERY CELLS

BACKGROUND OF THE INVENTION

This invention relates to a method of making a rechargeable electrolytic battery cell comprising a unitary laminate of polymeric electrode and separator elements. In particular, the invention relates to an economical method of shaping and sizing such a battery cell in a single operation which replaces multiple prior operations, yet ensures proper orientation and size relationships among the respective cell elements.

Versatile rechargeable battery cells, such as lithium-ion intercalation cells, are currently prepared from electrode elements comprising flexible sheets of polymeric composition in which are dispersed finely-divided particulate materials capable of reversibly intercalating lithium ions during battery charge/discharge cycles. Such materials include, as positive electrode components, lithium metal oxide intercalation compounds, e.g., $LiCoO_2$, $LiNiO_2$, and $LiMn_2O_4$, and, as negative electrode components, carbon materials, such as petroleum cokes and graphites.

Included in the cell structures are flexible electrode-interposed separator layer elements comprising polymers of essentially the same type as employed in the electrode elements, thus facilitating thermal lamination of the element layers to ultimately form the battery composite. Additional cell elements, such as metallic foil electrical current collectors, are also incorporated into the battery structure in a laminating operation.

A laminated battery cell representative of present structures is depicted in FIG. 1 of this specification, and the general process of battery cell fabrication is described in greater detail in U.S. Pat. No. 5,460,904 and its related patent specifications, incorporated herein by reference, which discuss typical compositions and procedures for formulating and laminating composite lithium-ion cells.

In the course of commercial development of the laminated polymeric battery certain requirements for maintaining the integrity and operational condition of these cells have become apparent. For example, while it was originally contemplated that economical mass production of single cell laminated batteries would entail fabrication of a large master laminate body followed by simple perpendicular cutting of the master body, e.g., with common guillotine or similar "punching" equipment, to obtain such batteries of desired size and shape, this anticipated expedient did not prove satisfactory for a number of reasons.

First, the fragile nature of the current collector layer elements resulted in the pressing of electrically conductive fragments of those elements into the laminated polymeric electrode and separator layers with resulting eventual short-circuiting in the cell. Further, the similar action upon the electrode layer compositions themselves forced edge portions of those elements into such close proximity that shorting became inevitable.

Yet an additional disadvantage of the practice was observed in the resultant compression of the separator layer. While this condition contributed somewhat to the noted shorting between electrode layers, more importantly it allowed an overpopulous flow of lithium ions across the shortened edge thickness of separator located between the electrodes, in effect leading to ions bypassing the separator element at that edge and resulting in dangerous plating of metallic lithium at the edge of the negative electrode element during recharging of the cell. In an effort to avoid such a plating condition by providing more ion-intercalating material at the problem site, excess negative electrode composition, usually in the form of an extended electrode layer, was included in the structure. While alleviating somewhat the plating problem, the practice led directly to excessive unproductive electrode material in the cell as a whole, thus increasing the cell weight and degrading specific capacity.

A more direct, yet further uneconomical, practice was then undertaken to appropriately size cell layer elements prior to lamination, including the oversizing of the separator layer to provide sufficient edge distance between electrodes in order to prevent ion bypass and hazardous plating. In this manner the previous cutting problems were eliminated entirely, but there were directly introduced into the fabrication process the disadvantages of multiple cutting and handling of individual cell elements, as well as the greater problem of arranging and maintaining the elements in proper registry during lamination to achieve the desired results.

The cell fabrication method of the present invention, on the other hand, enables the economical use of a master laminate body in that it provides means for avoiding the initial problems of cell element damage and deformation which resulted from punch-cutting and additionally enables the direct formation of sufficient inter-electrode separator edge material to avoid ion bypass and metallic lithium plating during cell recharge cycling. As a result, the invention enables realization of significant savings in time and materials, as well as of the increase in cell efficiencies and capacities which were initially envisioned in the use of laminated polymer cell batteries.

SUMMARY OF THE INVENTION

In the process of the present invention, the formation and lamination of battery cell elements is carried out in a manner described in the above-referenced specifications, utilizing, e.g., heated pressure rollers which results in unitary large area or continuous sheet master cell laminates from which individual single cell batteries may be cut. Unlike the earlier-attempted punch-cutting or perpendicular chopping operations, however, the present invention utilizes a lateral slicing operation which draws a cutting blade through the laminate body in a plane which is set at a significant angle from the perpendicular of the plane of the laminated layers.

As a result of this cutting operation, individual cells are obtained which may be of any shape or size and which possess element layer edges which are not only substantially devoid of contaminating adjacent layer materials, but are also of significantly greater sectional dimension than the thickness of the respective layers themselves. In this manner, the tendency toward lithium ion bypass and metallic plating are avoided by the greater intra-electrode edge spacing established by the separator layer.

BRIEF DESCRIPTION OF THE DRAWING

The present invention will be described with reference to the accompanying drawing of which.

DESCRIPTION OF THE INVENTION

Figure 1:
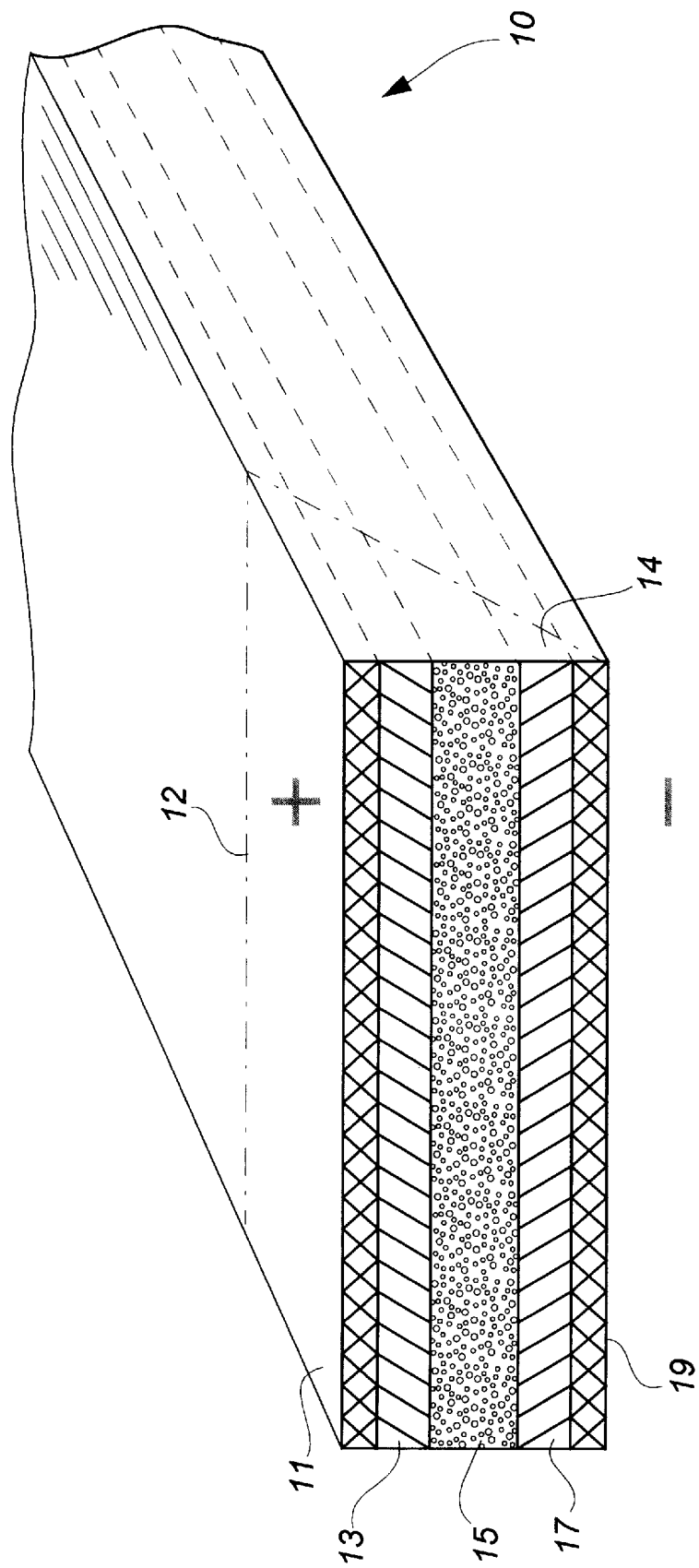
FIG. 1 is a sectional perspective representation of a typical laminated lithium-ion battery cell structure useful in the application of the present invention.

Useful laminated lithium-ion cell batteries have been made available economically through the technological advances described in the above-referenced incorporated patent specifications. A representative structure of such a cell 10 is depicted in FIG. 1 and essentially comprises positive and negative electrode layer elements 13, 17 between which is interposed an electron-insulative, ion-transmissive separator element 15 comprising, e.g., a microporous polymeric matrix, preferably of a polyvinylidene fluoride copolymer, within which a lithium salt electrolyte solution is readily absorbed. These electrode elements respectively comprise a lithiated intercalation compound, e.g., $Li_xMn_2O_4$, and a complementary material capable of reversibly intercalating lithium ions, e.g., carbon in the form of petroleum coke or graphite, each dispersed as finely-divided particulates in a polymeric matrix of, for example, the noted copolymer. Electrically-conductive current collectors 11, 19, preferably of aluminum and copper, respectively, are bonded by thermal lamination with respective electrode elements 13, 17 to form electrode members which are, in turn, similarly bonded with separator element 15 to form a unitary battery cell. In order to facilitate subsequent processing of the cell, such as during the incorporation of lithium salt solution electrolyte, the collector elements 11, 19 are preferably permeable to fluids, such as in the form of a reticulate expanded metal grid.

Figure 2:
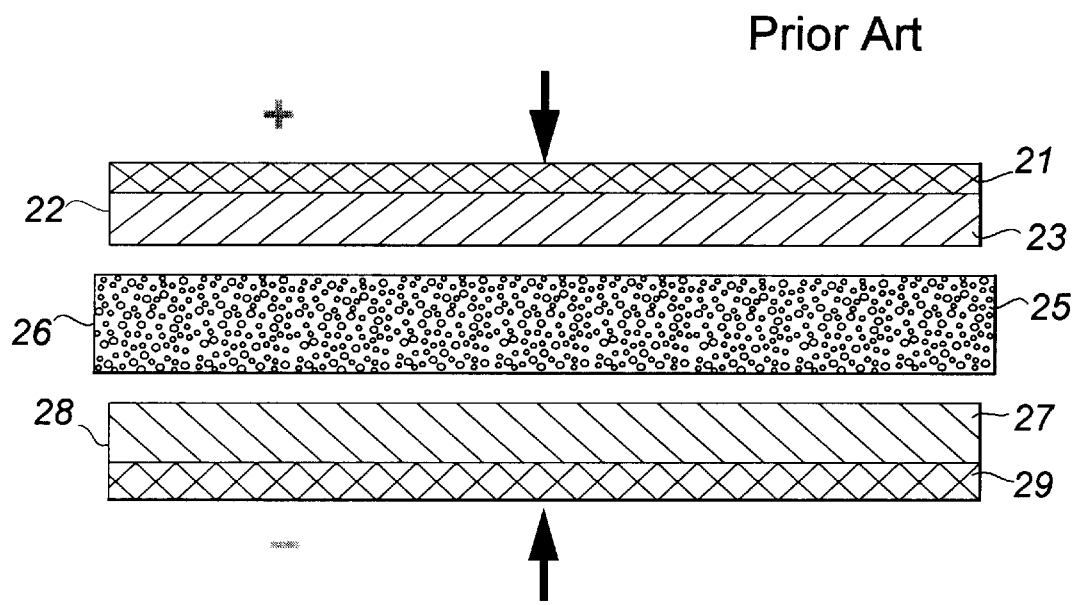
FIG. 2 is a sectional elevation representation of a final stage operation in a prior art method of preparing a laminated lithium-ion battery cell structure.

A method of fabricating a typical prior art cell structure is shown in FIG. 2 where previously laminated positive and negative composite electrode members respectively comprise collector grid and electrode elements 21, 23 and 27, 29. A polymeric separator layer element 25 which has been cut to have peripheral dimensions larger than electrode elements 23, 27 is carefully arranged in registry between those elements to ensure that its edges extend beyond the edges of electrode elements 23, 27. This assemblage is then laminated under heat and pressure applied in the direction of the arrows to form a unitary battery cell. The purpose of the outwardly extending edges 26 of the separator layer element is to minimize the chance of short-circuiting contact between extraneous bits of respective electrode layer materials, as well as to establish an excessively long path between electrode elements 23, 27 at exposed separator edge surface 26 in order to discourage lithium ion bypass around that separator edge during recharging and thus prevent plating of metallic lithium at an otherwise ion-saturated edge 28 of negative electrode element 27. In addition to using an oversized separator element in this manner, it was not uncommon practice to provide an excess of negative electrode material in the form of a greater electrode element thickness 28 than would stoichiometrically balance the thickness 22 of positive electrode 23. Such increased amounts of materials at separator 25 and negative electrode element 27 served merely as preventive measures and, not contributing directly to battery function, simply reduced the specific capacity of the battery cell.

Typical polymeric laminated battery cell compositions and element layers useful in the present invention are similar to those described in the referenced specifications and may be prepared as in the following examples.

EXAMPLE 1

A separator element coating solution was prepared by suspending 30 parts by weight of an 88:12 vinylidene fluoride (VdF):hexafluoropropylene (HFP) copolymer of about $380 \times 10^3$ MW (Kynar FLEX 2801, Atochem) and 20 parts silanized fumed silica in about 200 parts acetone and adding to this mixture about 40 parts dibutyl phthalate (DBP) plasticizer. The completed mixture was warmed to about 40° C. to facilitate dissolution of the copolymer and was homogenized in a laboratory ball mill for about 6 hr. A portion of the resulting slurry was coated on a glass plate with a doctor blade device gapped at about 0.5 mm. The acetone coating vehicle was allowed to evaporate within the coating enclosure under moderately flowing dry air at room temperature for about 10 min to yield a tough, flexible, plasticized film which was stripped from the glass plate. The film was about 0.1 mm thick and was easily cut into rectangular separator elements.

EXAMPLE 2

A positive electrode composition was prepared by homogenizing in a lid-covered stainless steel blender for about 10 min at 2500 rpm a mixture of 65 parts by weight of 53 μm sieved $Li_xMn_2O_4$, wherein $1<x\leq2$ (e.g., $Li_{1.05}Mn_2O_4$ prepared in a manner described in U.S. Pat. No. 5,266,299), 10 parts VdF:HFP copolymer (FLEX 2801) of Example 1, 18.5 parts dibutyl phthalate, 6.5 parts conductive carbon (Super-P Black, MMM Carbon, Belgium), and about 100 parts acetone. The resulting slurry was degassed by briefly applying a reduced pressure to the mixing vessel, and a portion was then coated on a glass plate with a doctor blade device gapped at about 0.4 mm. The coated layer was allowed to dry within the coating enclosure under moderately flowing dry air at room temperature for about 10 min to yield a tough, flexible film which was stripped from the glass plate. The film, comprising about 65% by weight of particulate active intercalation material, was about 0.12 mm thick and was easily cut into rectangular electrode elements.

EXAMPLE 3

A negative electrode composition was prepared by homogenizing in a lid-covered stainless steel blender for about 10 min at 2500 rpm a mixture of 65 parts by weight commercial petroleum coke (MCMB 25-10, Osaka Gas), 10 parts VdF:HFP copolymer (FLEX 2801) of example 1, 21.75 parts dibutyl phthalate, 3.25 parts Super-P conductive carbon, and about 100 parts acetone. The resulting slurry was degassed, and a portion was then coated on a glass plate with a doctor blade device gapped at about 0.5 mm. The coated layer was allowed to dry within the coating enclosure under moderately flowing dry air at room temperature for about 10 min to yield a tough, flexible film which was readily stripped from the glass plate. The film, comprising about 65% by weight of particulate active intercalation material, was about 0.15 mm thick and was easily cut into rectangular electrode elements.

EXAMPLE 4

A single cell battery comprising the foregoing elements was prepared according to the prior art in the manner depicted in FIG. 2, as follows. A positive current collector of aluminum foil 21 in the form of an open mesh grid of about 30 μm thickness (e.g., MicroGrid precision expanded foil, Delker Corp.) was trimmed to about 80 mm×40 mm. To enhance the ensuing adherence to its associated electrode element layer and improve contact resistance, grid 21 was surface-cleaned of oxides, such as with a caustic wash, and dip-coated with a conductive primer composition of commercial battery grade conductive carbon black, such as MMM Super P, dispersed in a commercially-available aqueous suspension of a copolymer of polyethylene with acrylic acid, e.g., Morton International Adcote primer 50C12. The fluid composition was sufficiently thin to preserve the reticulate nature of the grid and air-dried on the grid strands to a coating of about 1–5 µm thick.

A section of about 80 mm×40 mm was cut from the film of Example 2 to form a positive electrode element 23 which was then assembled in register with grid 21 and the assemblage was laminated in a commercial thermal, pressure roller card laminating apparatus at about 120–150° C. to form composite positive electrode member 21, 23. Negative electrode element 27 and collector element 29 were respectively cut to 80 mm×40 mm from the film of Example 3 and a sheet of MicroGrid expanded copper foil and were similarly laminated to form composite negative electrode member 27, 29. A section of the film of Example 1 was cut to about 85 mm×45 mm to form separator element 25 which was centrally registered between the previously prepared composite electrode members, as shown in FIG. 2, and the assemblage was laminated at about 100–120° C. to form a unitary battery cell structure in which separator 25 extended at edges 26 about 2.5 mm beyond the periphery of the electrode members. The cell was thereafter extracted of plasticizer, imbibed with electrolyte solution, and hermetically packaged in the manner described in the noted references.

The multiple operations and repeated handling and processing steps recited in the foregoing example typify the involved and inefficient method of battery cell fabrication which formerly prevailed in the industry. Together with the earlier-noted disadvantageous effects upon cell capacity and prolonged utility, these inefficiencies sorely tried the economical manufacture of desirable polymeric laminate batteries.

In contrast to those previous practices, the method embodied in the present invention provides a quick, efficient, and economical polymeric battery cell fabrication, as shown in the following example.

EXAMPLE 5

Sections of the separator, electrode, and current collector element sheets from Examples 1–4 were cut to the same size and laminated to form a unitary master cell sheet 10, such as depicted in FIG. 1. Since there are no limitations on the relative sizes of these elements, as were required above with respect to the prior registered fabrication method of Example 4, the master sheet may be formed in the efficient, continuous web procedure described, for instance, in referenced U.S. Pat. No. 5,460,904.

A single battery cell of desired peripheral dimensions of about 80 mm×40 mm was cut from the master sheet by means of orthogonal transverse slicing cuts, as along phantom guide line 12, with a blade set at an angle 14 from the perpendicular of the major plane surface of the master sheet. The resulting battery cell structure was then processed to incorporate electrolyte solution and packaged as with prior cells to provide a rechargeable battery of long recycling life and consistent high energy storage capacity.

Figure 3:
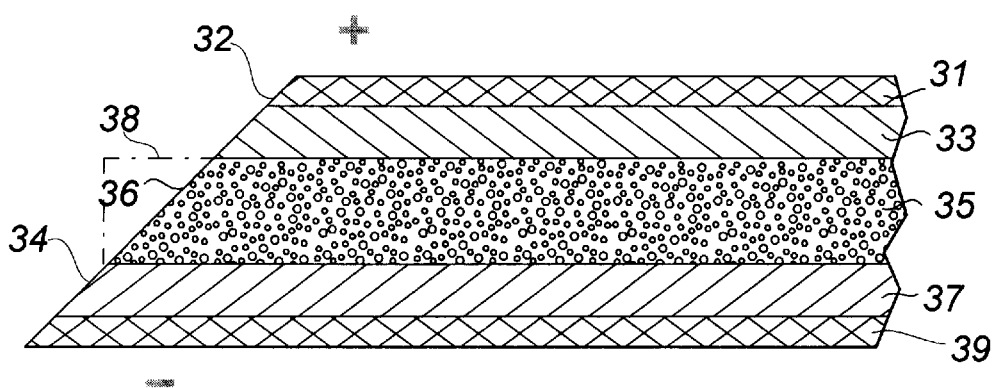
FIG. 3 is a sectional elevation representation of a laminated lithium-ion battery cell structure prepared according the present invention.

This unique manner of effecting a slicing cut eliminates the problematic layer-fracturing and compressing forces which led to the difficulties prevalent in the prior battery cells and, importantly, yields an angled cell edge surface 32 (FIG. 3) which at once provides an elongated separator layer edge 36 for deterring Li ion bypass and exposes an added measure of intercalation material at elongated edge 34 of negative electrode element 37 to accommodate the infrequent bypassing ions and further prevent hazardous metallic plating. Also shown in FIG. 3 are grid 31, positive electrode 33, separator 35 and grid 39, which are essentially the same as like elements shown in FIGS. 1 and 2.

The extent of elongation of the cell layer edges is a function of the angle of the severing slice through the master cell structure, since those edges, such as 36, are defined as the hypotenuse of the triangular layer section, as in phantom at 38, which is removed in the trimmed cell material. This angle has been found to preferably lie at about 30° to 60° which provides an edge elongation of from about 16% to 100% while not excessively weakening the cell structure. An angle of about 35° to 50°, providing elongation of about 22% to 56%, has proven to be particularly preferred.

Equipment for carrying out the angled-edge trimming of a battery cell according to the invention is commercially available in various levels of complexity, from a simple hand-held flat-bladed device, such as used in cutting picture framing mattes, to cutter-mounting, computer-controlled X-Y plotter systems. In these more elaborate types of equipment, the cutting elements may be in the form of motive blades or ablative devices, such as plasma jets and laser beams. In this manner, single cell batteries of any conceivable size and shape, from circular to polygon, may be readily and rapidly fabricated to match the requirements of utilizing applications.

It is anticipated that other embodiments and variations of the present invention will become readily apparent to the skilled artisan in the light of the foregoing specification. Such embodiments and variations are intended to likewise be included within the scope of the invention as set out in the appended claims.

What is claimed is:

1. A method of making a rechargeable battery cell comprising the steps of:

providing a positive electrode element including a flexible, polymeric matrix positive electrode film and a positive current collector;

providing a negative electrode element including a flexible, polymeric matrix negative electrode film and a negative current collector;

providing a flexible, polymeric matrix film separator element;

bonding said positive electrode element and said negative electrode element to opposite surfaces of said separator element to form a unitary multi-layer, planar battery cell structure, having a substantially flat profile with opposed planar major surfaces; and cutting said unitary battery cell along an angle in the range of about 30° to 60° from the perpendicular axis to the planar major surfaces to form an angled edge wherein edges of each said element lie along a common plane.

2. A method according to claim 1 further including the step of performing said cutting step a plurality of times to form intersecting planar edges which form a battery cell periphery.

3. A method according to claim 1 wherein said angle is in the range of about 35° to 50°.

4. A method according to claim 1 wherein said step of cutting is effected by a fixed or motive blade device.

5. A method according to claim 1 wherein said step of cutting is effected by an ablative device.

6. A rechargeable battery cell comprising:

a first electrode element comprising a flexible, polymeric matrix electrode film and a first current collector;

a separator element comprising a flexible, polymeric matrix film bonded to said first electrode element; and a second electrode element comprising a flexible, polymeric matrix electrode film and a second current collector bonded to said separator element;

wherein the bonded first electrode element, separator element and second electrode element, form a unitary multi-layer, planar battery cell structure, having a substantially flat profile with opposed planar major surfaces; and wherein edge portions of said cell structure are cut along an angle in the range of about 30° to 60° from the perpendicular axis to said planar major surfaces to form at least one angled edge lying along a common plane.

7. A battery cell according to claim 6 wherein said first electrode element has an opposite charge from said second electrode element.

8. A battery cell according to claim 6 wherein at least one of said first current collector and said second current collector is formed from a reticulate expanded metal grid.

9. A battery cell according to claim 6 further including a plurality of intersecting angled edges forming a periphery of said battery cell.

10. A battery cell according to claim 6 wherein said angle is in the range of about 35° to 50°.

* * * * *